US012450697B2

(12) United States Patent
Papas et al.

(10) Patent No.: US 12,450,697 B2
(45) Date of Patent: Oct. 21, 2025

(54) VOLUME DENOISING WITH FEATURE SELECTION

(71) Applicants: Disney Enterprises, Inc., Burbank, CA (US); ETH Zürich (EIDGENÖSSISCHE TECHNISCHE HOCHSCHULE ZÜRICH), Zürich (CH)

(72) Inventors: Marios Papas, Zurich (CH); Xianyao Zhang, Zurich (CH); Melvin Ott, Zurich (CH); Marco Manzi, Zurich (CH)

(73) Assignees: Disney Enterprises, Inc., Burbank, CA (US); ETH ZURICH (EIDGENÖSSISCHE TECHNISCHE HOCHSCHULE ZÜRICH), Zurich (CH)

( * ) Notice: Subject to any disclaimer, the term of this patent is extended or adjusted under 35 U.S.C. 154(b) by 504 days.

(21) Appl. No.: 17/958,198

(22) Filed: Sep. 30, 2022

(65) Prior Publication Data

US 2023/0109328 A1    Apr. 6, 2023

Related U.S. Application Data

(60) Provisional application No. 63/251,249, filed on Oct. 1, 2021.

(51) Int. Cl.
*G06T 5/70* (2024.01)
*G06N 20/20* (2019.01)

(52) U.S. Cl.
CPC ............. *G06T 5/70* (2024.01); *G06N 20/20* (2019.01); *G06T 2207/20081* (2013.01)

(58) Field of Classification Search
CPC ... G06T 5/70; G06T 2207/20081; G06T 5/60; G06T 2207/20084; G06N 20/20; G06N 20/00
See application file for complete search history.

(56) References Cited

U.S. PATENT DOCUMENTS

| 10,096,088 B2 | 10/2018 | Bitterli |
| 10,475,165 B2 | 11/2019 | Vogels |

(Continued)

OTHER PUBLICATIONS

B. Du et al. "Stacked Convolutional Denoising Auto-Encoders for Feature Representation," in IEEE Transactions on Cybernetics, vol. 47, No. 4, pp. 1017-1027, Apr. 2017, doi: 10.1109/TCYB.2016.2536638. (Year: 2017).*

(Continued)

*Primary Examiner* — Umair Ahsan
(74) *Attorney, Agent, or Firm* — Farjami & Farjami LLP

(57) ABSTRACT

A system includes a hardware processor and a system memory storing software code and one or more machine learning (ML) models. The hardware processor is configured to execute the software code to train a first ML model of the one or more ML models as a denoising feature selector, generate, using the trained first ML model a plurality of candidate feature sets, and identify a best volumetric feature set of the plurality of candidate feature sets using a predetermined selection criterion. The hardware processor is further configured to execute the software code to train, using the identified best volumetric feature set, one of the first ML model or a second ML model of the one or more ML models as a denoiser, receive an image including noise due to rendering, and denoise, using the trained denoiser, the noise due to rendering to produce a denoised image.

20 Claims, 7 Drawing Sheets

(56) References Cited

U.S. PATENT DOCUMENTS

| | | | |
|---|---|---|---|
| 10,572,979 | B2 | 2/2020 | Vogels |
| 2017/0270653 | A1* | 9/2017 | Garnavi .................. G06N 5/01 |
| 2018/0293496 | A1 | 10/2018 | Vogels |
| 2019/0304067 | A1 | 10/2019 | Vogels |
| 2019/0304068 | A1 | 10/2019 | Vogels |
| 2019/0304069 | A1 | 10/2019 | Vogels |
| 2020/0027198 | A1 | 1/2020 | Vogels |
| 2023/0080693 | A1* | 3/2023 | Hu ........................... G06T 5/70 |
| | | | 382/275 |

OTHER PUBLICATIONS

Marco Ancona, Cengiz Oztireli, Markus Gross "Explaining Deep Neural Networks with a Polynomial Time Algorithm for Shapley Values Approximation" Proceedings of the 36th International Conference on Machine Learning, Long Beach, CA 2019, 10 Pgs.

Steve Bako, Thijs Vogels, Brian McWilliams, Mark Meyer, Jan Novak, Alex Harvill, Predeep Sen, Tony DeRose, Fabrice Rousselle "Kernel-Predicting Convolutional Networks for Denoising Monte Carlo Renderings" ACM Trans. Graph. 36, 4, Article 97 Jul. 2017, 14 Pgs.

Benedikt Bitterli, Fabrice Rousselle, Bochang Moon, Jone A. Iglesias-Guitian, David Adler, Kenny Mitchell, Wojciech Jarosz, Jan Novak "Nonlinearly Weighted First-order Regression for Denoising Monte Carlo Renderings" Eurographics Symposium on Rendering 216, 11 Pgs.

Antoni Buades, Bartomeu, Jean-Michel Morel "A non-local algorithm for image denoising" 2005 IEEE Computer Society Conference on Computer Vision and Pattern Recognition (CVPR'05), San Diego, CA, USA, 2005, pp. 60-65 vol. 2.

Javier castro, Daniel Gomez, Juan Tejada "Polynomial calculation of the Shapley value based on sampling" Computers & Operations Research vol. 36, Issue 5, May 2009, 3 Pgs.

Chakravarty R. Alla Chaitanya, Anton S. Kaplanyan, Christoph Schied, Marco Salvi, aaron Lefofn, Derek Nowrouzezahrai, Timo Aila "Interactove Reconstruction of Monte Carlo Image Sequences using a Recurrent Denoising Autoencoder" ACM Trans. Graph. 36, 4, Article 98 Jul. 2017, 12 Pgs.

Shay Cohen, Eytan Ruppin, Gideon Dror "Feature Selection Based on the Shapley Value" Proceedings of the 19th International Joint Conference on Artificial Intelligence Jul. 2005 pp. 665-670.

Michael Gharbi, Tzu-Mao Li, Miika Aittala, Jaakko Lehtinen, Fredo Durand "Sample-based Monte Carlo Denoising using a Kernel-Splattering Network" ACM Trans. Graph., vol. 38, No. 4, Article 125. Jul. 2019 12 Pgs.

Jie Guo, Mengtian, Quewei Li, Yuting Qiang, Bingyang Hu, Yanwen Guo, Ling-Qi Yan "Gradnet Unsupervised deep screened poisson reconstruction for gradient-domain rendering" ACM Transactions on Graphics, vol. 38, Issue 6, Dec. 2019, Article No. 223, pp. 1-13.

Nikolai Hofmann, Jana Martschinke, Klaus Engel, Marc Stamminger "Neural Denoising for Path Tracing of Medical Volumetric Data" Proceedings of the ACM on Computer Graphics and Interactive Techniques, vol. 3, issue 2, Aug. 2020 Article No. 13, 3 Pgs.

Diederik P. Kingma, Jimmy Lei Ba "Adam: A Method for Stochastic Optimization" 3rd International Conference for Learnng Representations, san Diego, 2015, 15 Pgs.

Scott M. Lundberg, Su-In Lee "A Unified Approach to Interpreting Model Predictions" Proceedings of the 31st International Conference on Neural Information Processing Systems, Dec. 2017, 10 Pgs.

Olaf Ronneberger, Philipp Fischer, Thimas Broz "U-Net: Convolutional Networks for Biomedical Image Segmentation" Medical Image Computing and Computer-Assisted Intervention 2015 8 pgs.

Fabrice Rousselle, Marco Manzi, Matthias Zwicker "Robust Denoising using Feature and Color Information" Pacific Graphics, vol. 32, No. 7 2013 10 pgs.

L.S. Shapley "A Value for n-Person Games" Contributions to the Theory of Games 1953 4 Pgs.

Thijs Vogels, Fabrice Rousselle, Brian McWilliams, Gerhard Rothlin, Alex Harvill, David Adler, Mark Meyer, Jan Novak "Denoising with Kernel Prediction and Asymmetric Loss Functions" ACM Trans. Graph. 37, 4, Article 124, Aug. 2018, 15 Pgs.

Z. Wang, E.P. Simoncelli, A.C. Bovik "Multiscale structural similarity for image quality assessment" The Thrity-Seventh Asilomar Conference on Signals, Systems & Computers, Pacific Grove, CA, 2003, 3 Pgs. vol. 2.

Zilin Xu, Qiang Sun, Ku Wang "Unsupervised Image Reconstruction for Gradient-Domain Volumetric Rendering" Computer Graphics Forum Nov. 24, 2020 3 Pgs.

* cited by examiner

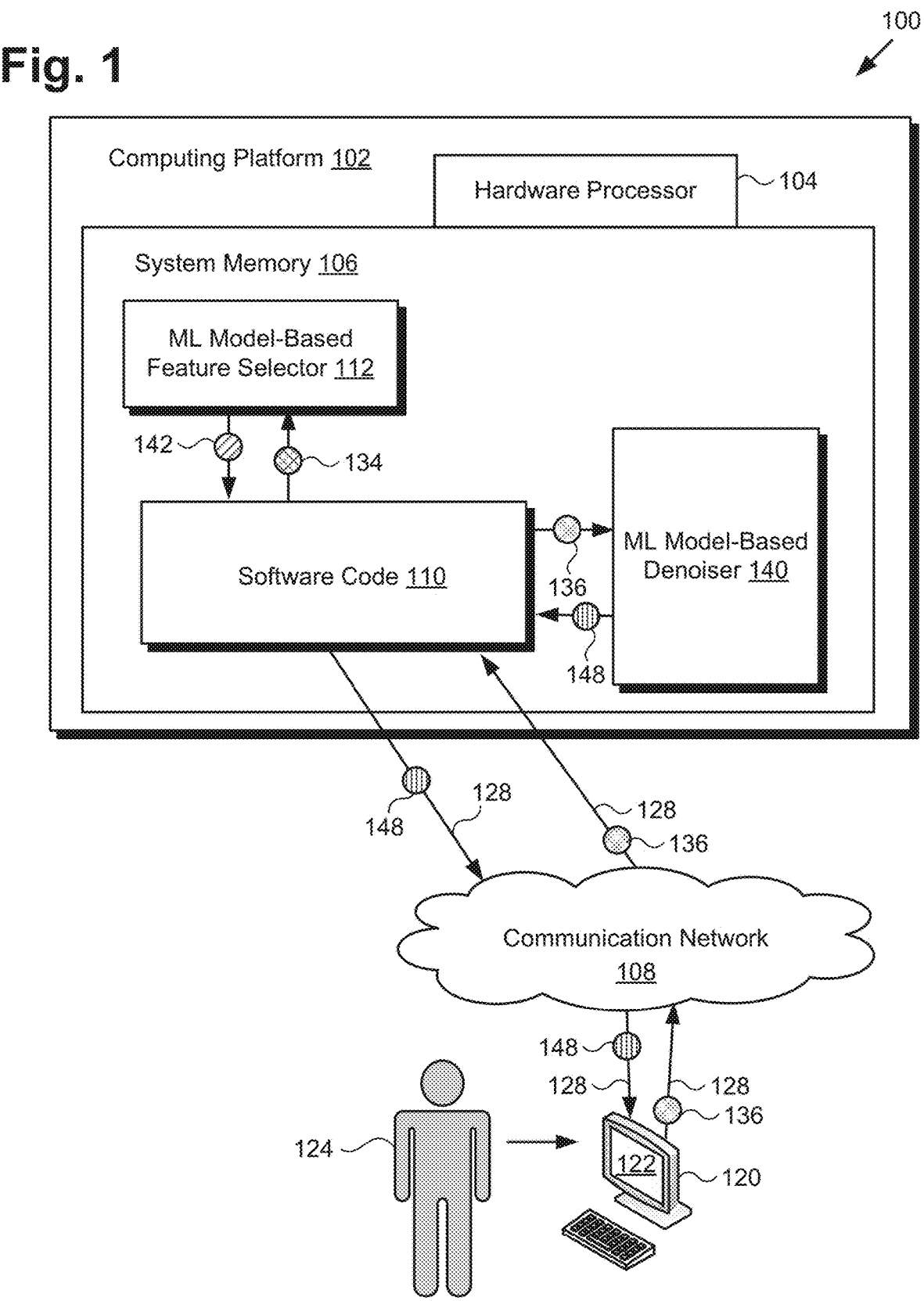

| Symbol | Feature Name | Range |
|---|---|---|
| $L_{i,ss}$ | Single scattering | $\mathbb{R}_+$ |
| $L_{i,ms}$ | Multiple scattering | $\mathbb{R}_+$ |
| $\rho_{vol}$ | Volume albedo | $[0,1]$ |
| $\sigma_s$ | Scattering coefficient | $\mathbb{R}_+$ |
| $T_r$ | Transmittance | $[0,1]$ |
| $z_v$ | Volume interaction length | $\mathbb{R}_+$ |
| $\mathbf{v}$ | Velocity direction | $[-1,1]$ |
| $\|\hat{\mathbf{v}}\|$ | Velocity magnitude | $\mathbb{R}_+$ |
| $\mathbf{n}_{vol}$ | Density gradient direction | $[-1,1]$ |
| $\|\hat{\mathbf{n}}_{vol}\|$ | Density gradient magnitude | $\mathbb{R}_+$ |
| $\mathbf{p}$ | Object-space position | $\mathbb{R}$ |
| $z_{cam}$ | Distance to camera | $\mathbb{R}_+$ |
| $\tau$ | Optical thickness | $\mathbb{R}_+$ |
| $r_{sct}$ | Scattering ratio | $[0,1]$ |
| $\sigma_t$ | Extinction coefficient | $\mathbb{R}_+$ |

Fig. 2B

---
Algorithm 1: Standard Shapley values
---
    Input: $N_{perm}$, number of permutation samples
             $F$, list of candidate features
             $x_{all}$, input image with all features
             $y_{ref}$, reference image
             $g$, trained denoiser
             $\ell$, loss function
    Output: $\phi_g$, Shapley value for each feature $y_{all} \leftarrow g(x_{all})$
$l_{all} \leftarrow \ell(y_{ref}, y_{all}) \quad \phi_g \leftarrow 0$
for $n \leftarrow 1, 2, \ldots, N_{perm}$ do
    $x \leftarrow x_{all}$
    $l_0 \leftarrow l_{all}$
    for $f$ in randomPermutation($F$) do
        $x \leftarrow$ setFeatureToDefault($x, f$)
        $y_0 \leftarrow g(x)$
        $l \leftarrow \ell(y_{ref}, y_0)$
        $\Delta \leftarrow l - l_0$
        $\phi_g(f) \leftarrow \phi_g(f) + \text{mean}(\Delta)$
        $l_0 \leftarrow l$
    end
end
$\phi_g \leftarrow \phi_g / N_{perm}$
return $\phi_g$

Fig. 2C

Algorithm 2: Discounted Shapley values

Input: $N_{perm}$, number of permutation samples
$\gamma$, discount factor
($\gamma = 1 \Rightarrow$ Shapley values, $\gamma \to 0 \Rightarrow$ greedy)
$F$, list of candidate features
$x_{all}$, input image with all features
$y_{ref}$, reference image
$g$, trained denoiser
$\ell$, loss function

Output: $\phi_g$, Shapley value for each feature $y_{all} \leftarrow g(x_{all})$
$l_{all} \leftarrow \ell(y_{ref}, y_{all})$  $\phi_g \leftarrow 0$
for $n \leftarrow 1, 2, \ldots, N_{perm}$ do
    $x \leftarrow x_{all}$
    $l_0 \leftarrow l_{all}$
    $N_0 \leftarrow |F|$ // #Other activated features
    for $f$ in randomPermutation($F$) do
        $x \leftarrow$ setFeatureToDefault($x, f$)
        $N_0 \leftarrow N_0 - 1$
        $y_0 \leftarrow g(x)$
        $l \leftarrow \ell(y_{ref}, y_0)$
        $\Delta \leftarrow l - l_0$
        $\phi_g(f) \leftarrow \phi_g(f) + \gamma^{N_0} \text{mean}(\Delta)$
        $l_0 \leftarrow l$
    end
end
$\phi_g \leftarrow \phi_g / N_{perm}$
return $\phi_g$

Algorithm 3: Conditional Shapley values

Input: $N_{perm}$, number of permutation samples
$F$, list of candidate features
$x_{all}$, input image with all features
$y_{ref}$, reference image
$g$, trained denoiser
$\ell$, loss function (e.g., SMAPE, DSSIM, ꟻLIP)

Output: $F_{ranked}$, list of features ranked in the order of importance
$\tilde{\phi}_g$, conditional Shapley value for each feature

---

$F_{ranked} \leftarrow [\ ]$
$\tilde{\phi}_g \leftarrow 0$
for $k \leftarrow 1, 2, \ldots, |F_{all}|$ do
$\quad F_{curr} \leftarrow F_{all} \setminus F_{ranked}$
$\quad \phi_g \leftarrow \text{StandardShapleyValues}(N_{perm}, F_{curr}, x_{all}, y_{ref}, g, \ell)$
$\quad f_{best} \leftarrow \text{argmax}_{f \in F_{curr}}(\phi_g)$
$\quad F_{ranked}.\text{append}(f_{best})$
$\quad \tilde{\phi}_g(f_{best}) \leftarrow \phi_g(f_{best})$
end
return $F_{ranked}$

VOLUME DENOISING WITH FEATURE SELECTION

RELATED APPLICATIONS

The present application claims the benefit of and priority to a Provisional Patent Application Ser. No. 63/251,249 filed on Oct. 1, 2021, and titled "Volume Denoising with Feature Selection," which is hereby incorporated fully by reference into the present application.

BACKGROUND

Volumetric effects such as fog, smoke, and clouds play an important role in animated movies and visual effects. However, these volumetric effects are among the most computationally expensive effects to render using conventional production techniques. For example, due to its generality and simplicity, the most widely used technique in production rendering is path tracing, in which the light transport in a virtual scene is simulated using Monte-Carlo integration methods. The main drawback of path tracing is computation cost. For complex scenes, in particular those containing volumetric effects, hundreds of hours of computation time on modern computers are typically required to render a single clean frame at final-production quality. Moreover, if the rendering process is stopped prematurely, the resulting image may undesirably exhibit disturbing noise artifacts.

One approach to reducing computation time is denoising. That is, instead of waiting for an image to slowly converge to a clean image, rendering is stopped at a relatively early stage, and the intermediate noisy image can be processed in post-production by an algorithm that removes the residual noise in the rendering. However, at present there is no consensus with respect to establishment of a set of volumetric features for improving the preservation of salient volumetric details during post production volume denoising.

BRIEF DESCRIPTION OF THE DRAWINGS

FIG. 1 shows a diagram of an exemplary system for performing volume denoising with feature selection, according to one implementation:

FIG. 2A shows a table identifying volumetric features suitable for use in performing volume denoising, according to one implementation;

FIG. 2B presents pseudocode of an algorithm for determining standard Shapely values, according to one implementation;

FIG. 2C presents pseudocode of an algorithm for discounting Shapely values, according to one implementation;

FIG. 2D presents pseudocode of an algorithm for determining conditional Shapely values, according to one implementation;

DETAILED DESCRIPTION

Figure 3:
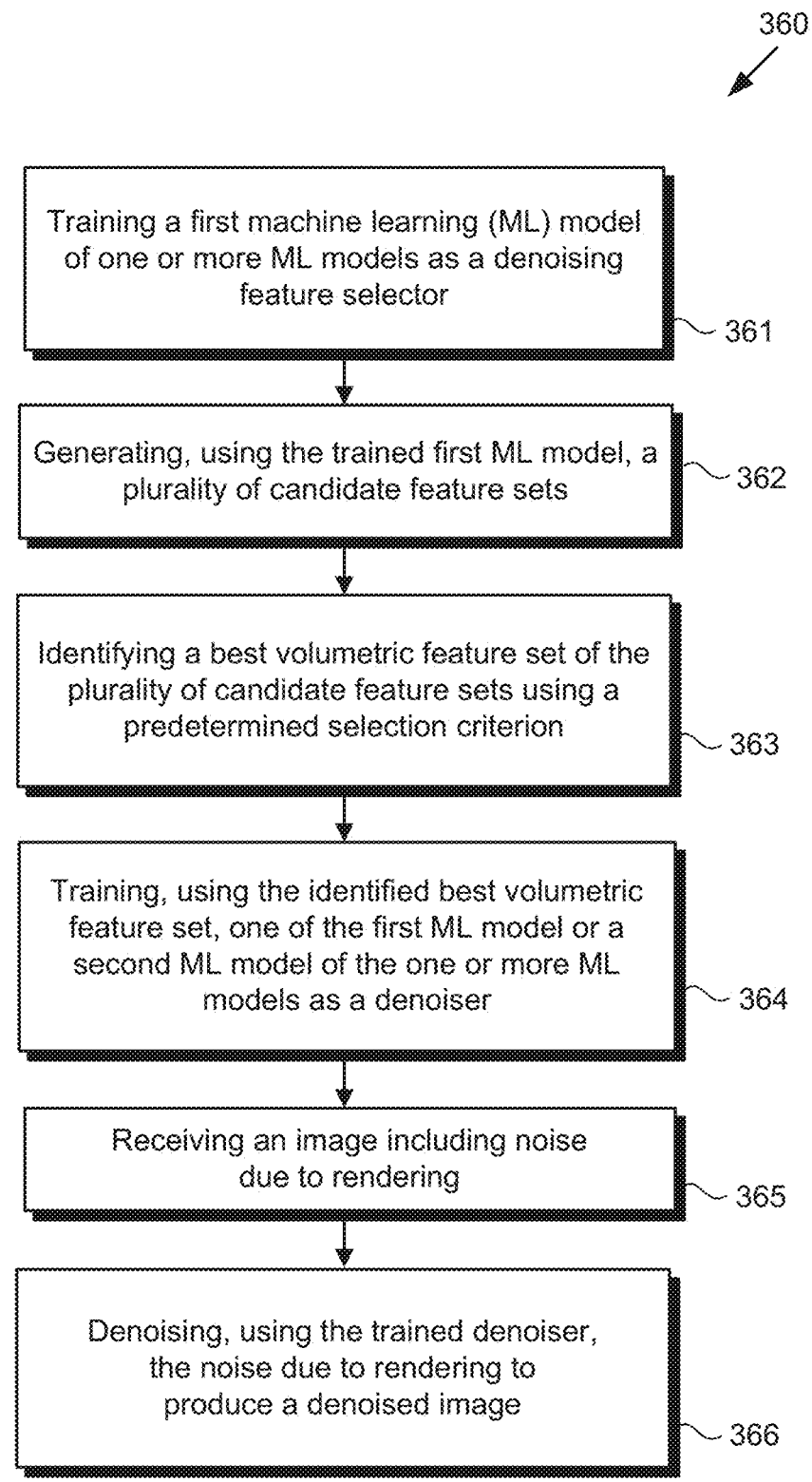
FIG. 3 shows a flowchart presenting an exemplary method for performing volume denoising with feature selection, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, volumetric effects such as fog, smoke, and clouds play an important role in animated movies and visual effects. However, these volumetric effects are among the most computationally expensive effects to render using conventional production techniques. For example, due to its generality and simplicity, the most widely used technique in production rendering is path tracing, in which the light transport in a virtual scene is simulated using Monte-Carlo integration methods. The main drawback of path tracing is computation cost. For complex scenes, in particular those containing volumetric effects, hundreds of hours of computation time on modern computers are typically required to render a single clean frame at final-production quality. Moreover, if the rendering process is stopped prematurely, the resulting image may undesirably exhibit disturbing noise artifacts. One approach to reducing computation time is denoising. That is, instead of waiting for an image to slowly converge to a clean image, rendering is stopped at a relatively early stage, and the intermediate noisy image can be processed in post-production by an algorithm that removes the residual noise in the rendering.

One key aspect in denoising Monte-Carlo renderings is that additional information about the scene is available besides the noisy image itself. This additional information can be used to support the denoiser. To that end, renderers can output auxiliary feature maps alongside the color image, such as the albedo or normal of the directly visible surfaces, for instance. Passing those feature maps to the denoiser can help preserve scene details more accurately. While there is an established set of auxiliary features that are commonly used to improve the preservation of geometric and surface details, as also noted above no such consensus exists yet with respect to which auxiliary features to use to improve the preservation of salient volumetric details when performing post production volume denoising.

The present application is directed to reducing computation times for renderings that contain volumetric effects. The present application discloses a set of auxiliary volumetric features that are helpful for denoising volumetric effects, and that can be obtained with low overhead during rendering. Starting with a large set of hand-crafted candidate volumetric features, a feature attribution process is performed in order to identify the most important volumetric features for improving the denoising quality of volumetric details. As disclosed herein, a denoiser trained with only a small subset of the original set of candidate volumetric features that contains only the most important volumetric features according to this selection process can provide significant improvement over the conventional art.

FIG. 1 shows a diagram of exemplary system 100 for performing volume denoising with feature selection, according to one implementation. As shown in FIG. 1, system 100 includes computing platform 102 having hardware processor 104, and system memory 106 implemented as a computer-readable non-transitory storage medium. According to the present exemplary implementation, system memory 106 stores software code 110, machine learning (ML) model-based feature selector 112, which may be implemented as a kernel-predicting convolutional network (KPCN) for example, and ML model-based denoiser 140, which may also be implemented as a KPCN.

It is noted that, as defined in the present application, the expression "machine learning model" or "ML model" refers to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to a NN that utilizes multiple hidden layers between input and output layers, which may allow for learning based on volumetric features not explicitly defined in raw color data. As used in the present application, a feature refers to an additional output image from the renderer that can help with denoising. In various implementations. NNs may be trained as classifiers and may be utilized to perform image processing, audio processing, or natural-language processing.

As further shown in FIG. 1, system 100 is implemented within a use environment including communication network 108, user system 120 including display 122, and user 124 utilizing user system 120, as well as network communication links 128 interactively connecting user system 120 and system 100 via communication network 108. Also shown in FIG. 1 are candidate feature sets 134, best volumetric feature set 142 for use in training ML model-based denoiser 140 or retraining ML model-based feature selector 112 as a denoiser, noisy image 136 including noise due to rendering, and denoised image 148 corresponding to noisy image 136 and produced by software code 110 using one of ML model-based feature selector 112 or ML model-based denoiser 140.

With respect to the representation of system 100 shown in FIG. 1, it is noted that although software code 110, ML model-based feature selector 112, and ML model-based denoiser 140 are depicted as being stored in system memory 106 for conceptual clarity, more generally, system memory 106 may take the form of any computer-readable non-transitory storage medium. The expression "computer-readable non-transitory storage medium." as used in the present application, refers to any medium, excluding a carrier wave or other transitory signal that provides instructions to hardware processor of a computing platform, such as hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs. RAM, programmable read-only memory (PROM), erasable PROM (EPROM), and FLASH memory.

It is further noted that although FIG. 1 depicts software code 110. ML model-based feature selector 112, and ML model-based denoiser 140 as being mutually co-located in system memory 106 that representation is also merely provided as an aid to conceptual clarity. More generally, system 100 may include one or more computing platforms, such as computer servers for example, which may be co-located, or may form an interactively linked but distributed system, such as a cloud-based system, for instance. As a result, hardware processor 104 and system memory 106 may correspond to distributed processor and memory resources within system 100. Thus, it is to be understood that software code 110, ML model-based feature selector 112, and ML model-based denoiser 140 may be stored remotely from one another within the distributed memory resources of system 100. Moreover, in some implementations, one or both of ML model-based feature selector 112 and ML model-based denoiser 140 may take the form of a software module included in software code 110. It is also noted that, in some implementations, ML model-based denoiser 140 may be omitted from system 100, and ML model-based feature selector 112 may be retrained, after performing feature selection, to serve as a denoiser in place of ML model-based denoiser 140.

Hardware processor 104 may include multiple hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. However, in some implementations, system 100 may be implemented virtually, such as in a data center. For example, in some implementations, system 100 may be implemented in software, or as virtual machines. Moreover, in some implementations, communication network 108 may be a high-speed network suitable for high performance computing (HPC), for example a 10 GigE network or an Infiniband network.

Although user system 120 is shown as a desktop computer in FIG. 1 that representation is provided merely as an example as well. More generally, user system 120 may be any suitable mobile or stationary computing device or system that implements data processing capabilities sufficient to provide a user interface, support connections to communication network 108, and implement the functionality ascribed to user system 120 herein. For example, in other implementations, user system 120 may take the form of a laptop computer, tablet computer, or smartphone, for example.

It is noted that, in various implementations, denoised image 148, when produced using software code 110, may be stored in system memory 106, may be copied to non-volatile storage, or both. Alternatively, or in addition, as shown in FIG. 1, in some implementations, denoised image 148 may be sent to user system 120 including display 122, for example by being transferred via network communication links 128 of communication network 108.

With respect to display 122 of user system 120, display 122 may be physically integrated with user system 120 or may be communicatively coupled to but physically separate from user system 120. For example, where user system 120 is implemented as a smartphone, laptop computer, or tablet computer, display 122 will typically be integrated with user system 120. By contrast, where user system 120 is implemented as a desktop computer, display 122 may take the form of a monitor separate from user system 120 in the form of a computer tower. Furthermore, display 122 of user system 120 may be implemented as a liquid crystal display (LCD), a light-emitting diode (LED) display, an organic light-emitting diode (OLED) display, a quantum dot (QD) display, or any other suitable display screen that performs a physical transformation of signals to light.

Regarding noisy image 136 and denoised image 148, it is noted that the content of noisy image 136 and denoised image 148 may include content of a variety of different types. For example, noisy image 136 and denoised image 148 be or include audio-video content having both audio and video components, or may include a still image or video unaccompanied by audio. In addition, or alternatively, in some implementations, noisy image 136 and denoised image 148 may be or include digital representations of persons, fictional characters, locations, objects, and identifiers such as brands and logos, for example, which populate a virtual reality (VR), augmented reality (AR), or mixed reality (MR) environment. Such digital representations may depict virtual worlds that can be experienced by any number of users synchronously and persistently, while providing continuity of data such as personal identity, user history, entitlements, possessions, payments, and the like. Moreover, in some implementations, the content included in noisy image 136 and denoised image 148 may be a hybrid of traditional audio-video and fully immersive VR/AR/MR experiences, such as interactive video.

The goal of the novel and inventive volume denoising solution disclosed in the present application is to reduce computation times for renderings that contain volumetric effects by configuring and training an ML model-based denoiser specifically for such volumetric effects. In some implementations, the present solution utilizes a KPCN having a standard architecture but modified functionality to facilitate volume denoising. For example, in contrast to conventional use of a KPCN, here the color may be decomposed into two buffers, separating the surface contribution from the volumetric contribution. These two buffers are denoised separately by ML model-based denoiser 140, and the denoised results are added up to create a clean final color image.

Depending on which component is being denoised, i.e., the surface component or the volumetric component, a different set of auxiliary features is provided to the ML model-based denoiser alongside the noisy component to help with the denoising task. Although standard features may be used for denoising of the surface component, a novel set of volumetric features is selected for denoising of the volume component, as described below.

First, a set of volumetric features is hand-crafted and then feature subsets can be selected from that set programmatically. The criteria used for producing the hand-crafted set are the following: volumetric features are selected that can be extracted without significant computation overhead during volumetric path tracing, exhibit structures that correlate with the clean color image, and have lower noise levels than the corresponding noisy color image. Table 200A in FIG. 2A lists an exemplary complete set of volumetric features.

To begin with, two volumetric features are selected that correspond to path-space decompositions of volumetric light transport. The single-scattering feature $L_{i,ss}$ listed in table 200A corresponds to illumination that experienced exactly one scattering interaction with the volume or volumes directly visible at each pixel. The multiple-scattering feature $L_{i,ms}$ listed in table 200A corresponds to illumination that experiences more than one scattering interaction with the volume or volumes directly visible at each pixel.

The remaining volumetric features listed in table 200A correspond to quantities evaluated during volumetric path tracing and are collected both at the first and second volumetric interactions unless mentioned otherwise. Among those remaining volumetric features are the scatter position (p), scattering albedo $$\left(\rho_{vol} = \frac{\sigma_s}{\sigma_t}\right),$$

scattering coefficient ($\sigma_s$), and extinction coefficient ($\sigma_t$). Also included are the length of the path segment prior to the interaction, starting either from the camera ($z_{cam}$, only at the first interaction) or from the volume bounding shape ($z_v$, both first and second interactions). Next, the estimated transmittance ($T_r$) and optical thickness ($\tau$) are obtained along the path segments, and the scattering ratio ($r_{sct}$) is recorded, which represents the ratio of scattering interactions over the total number of paths in the pixel. In heterogeneous volumes, the volume density gradient direction ($n_{vol}$) and magnitude ($\|n_{vol}\|$), akin to surface normal, are recorded. Finally, when available, the velocity direction (v) and magnitude ($\|\hat{v}\|$) of the underlying physical simulation are also extracted as volumetric features. Also included as volumetric features are the estimated standard deviation of $\sigma_s$ and $z_{cam}$, but the variance or standard deviation for other volumetric features are typically not included.

Although using a large set of volumetric features can improve denoising quality over non-use of volumetric features, the use of a large set of volumetric features imposes considerable storage cost and data loading overhead. Moreover, some of the volumetric features identified above are found to be redundant or offer little additional useful information when combined with other volumetric features, which results in diminishing returns when adding more volumetric features to the input provided to a ML model-based denoiser. In fact, a relatively small subset of the volumetric feature set described above is typically sufficient to reap most benefits in terms of denoising quality. It is, however, challenging to identify such a subset because of the difficulty in predicting the effect of different volumetric feature combinations on volume denoising quality.

Given a set of volumetric features P, the approach disclosed herein seeks the subset $S^* \subseteq P$ that leads to the best volume denoising quality. In some use cases, it may be advantageous to formulate the problem as a tradeoff or balance between denoising quality and the number of volumetric features used to perform the volume denoising.

In the absence of any initial knowledge about the importance of particular volumetric features for a given denoising problem, or a model for predicting denoising quality improvement in response to the use of different volumetric feature sets, a brute force approach to optimizing denoising would be required in which multiple denoisers are trained with different feature sets $S \subseteq P$ as inputs, and the feature set leading to a denoiser with lowest average denoising error on a large selection dataset is identified. This brute force solution quickly becomes infeasible even for relatively small volumetric feature sets, as the number of subsets to consider, and thus the number of denoisers to train, is $2^{|P|}$.

By contrast, the novel and inventive approach disclosed in the present application introduces an efficient solution having low approximation error and requiring the training of only one denoiser for feature selection, i.e., ML model-based feature selector 112, in FIG. 1. Once trained, ML model-based feature selector 112 can be used to predict the impact of different volumetric feature combinations on the final volume denoising error. It is noted that according to the exemplary implementation disclosed herein a greedy feature set selection algorithm may be utilized that only requires testing at most $O(|P|^2)$ subsets with ML model-based feature selector 112, thereby advantageously avoiding combinatorial complexity at the cost of some approximation error.

By way of overview, and referring to FIGS. 1 and 2A, the volume denoising with feature selection solution disclosed by the present application may include the following:

Train ML model-based feature selector 112 having any desired network architecture to measure the quality of different combinations of the volumetric features listed in table 200, i.e., feature subsets $S \subseteq P$ without retraining;

Construct a sequence of candidate feature sets 134, $\underline{P} = \{S_i: i=0, 1, \ldots, |P|\}$ with $S_0 \subset S_1 \subset \ldots \subset S_{|P|} = P$, using a forward selection algorithm, where feature sets of progressively increasing sizes are generated using ML model-based feature selector 112;

Identify best volumetric feature set 142 $\tilde{S}^* \subseteq \underline{P}$ that yields either the smallest volume denoising error or a predetermined balance between volume denoising quality and volumetric feature set size; and Train ML model-based denoiser 140 from scratch to be a specialized denoiser, using best volumetric feature set 142 $\tilde{S}^*$, or use ML model-based feature selector 112 and best volumetric feature set 142 $\tilde{S}^*$ to perform volumetric denoising.

With respect to feature selection, a selection process based on Shapley values may be used. Coming from cooperative game theory, Shapley values may be thought of as a measure of the contribution of different input features to some loss function. The key point about Shapley values is that they measure by how much an input feature changes the loss when it is present compared to when it is absent. When the features are continuous, it is necessary to define what the absence of a feature means in order to compute the Shapley value. According to the present approach, when a feature is absent, its value is reset to a predefined feature-specific default value of one (1) or zero (0) everywhere.

One difficulty arises from the fact that the changes in loss due to a feature typically depend heavily on which other features are present. To solve this issue, Shapley values can be defined by introducing a characteristic function $v: 2^{|P|} \to \mathbb{R}$ that maps a subset of features $S \subseteq P$ to the loss when using only this subset of features. To evaluate the contribution of a feature p to the loss v(P), the losses with and without the feature p are compared, considering all possible combinations of other features. The marginal contribution of feature p to subset $S(P \notin S)$ may be defined as:

$$\Delta_v(p,S) = v(S \cup \{p\}) - v(S) \quad \text{(Equation 1)}$$

Then, the Shapely value of the feature p, $\phi_v(p)$ is defined by averaging the marginal contribution over all possible subsets, weighted by the frequency of each subset:

$$\phi_v(p) = \sum_{S \subseteq P, p \notin S} \frac{|S|!(N-|S|-1)!}{N!} \Delta_v(p, S) \quad \text{(Equation 2)}$$

It is noted that the Shapley value can be alternatively defined by summing over all possible permutations of the features and sequentially resetting features in the ordering of the permutation. Let $\Pi$ denote the set of all possible permutations of $\{1, 2, \ldots, N\}$, and $\pi \in \Pi$ be one such permutation, and define id(•) as the indexing function with $id(p_i) = i$. The expression $S_{p,\pi} = \{p_j: \pi(j) < \pi(id(p))\}$ is used to denote the set of features that come before p in permutation $\pi$. An equivalent definition to Equation (2) then reads as follows:

$$\phi_v(p) = \sum_{\pi \in \Pi} \frac{1}{N!} \Delta_v(p, S_{p,\pi}) \quad \text{(Equation 3)}$$

It is evident that the exact evaluation of Shapley values is prohibitively expensive, requiring a number of model runs that is exponential with respect to the number of features. However, the Shapley values can be approximated based on randomly sampling feature permutations. After sampling a permutation of the features, each feature is reset in turn and the network is repeatedly evaluated with reduced sets of input features. The difference in loss in each step is regarded as one estimate of the Shapley value of the feature causing this difference. The algorithm for standard Shapley value is described in detail in algorithm 1, for which pseudocode is presented in FIG. 2B.

It is important to note that useful feature sets cannot be obtained based on the per-feature Shapley value alone. Shapley value measures the importance of features, but that alone does not reveal anything about the correlation between features, which would be required to define a meaningful feature set. For example, where two features are strongly correlated, using both features simultaneously is actually redundant because either feature can provide the model with the same information. These two strongly correlated features will be assigned very similar standard Shapley values, however. This means any feature set based solely on those values will select both features despite one of them being redundant.

The standard Shapley values represent feature importance by equally considering all possible feature permutations. However, for the task of feature selection, smaller feature sets are preferred over larger ones that perform similarly, which is a determination that cannot be made using standard Shapley values. For this purpose, the Shapley value formulation is modified through addition of a discount factor $\gamma \in (0,1)$ to down-weight the feature importance computed when many features are activated. Therefore, feature selection based on lower $\gamma$ values will prefer features that are effective in smaller sets. The modified algorithm is shown as algorithm 2, for which pseudocode is presented in FIG. 2C.

It is noted that when $\gamma = 1$, the discounted algorithm is identical to standard Shapley value, and when $\gamma \to 0$, the discounted algorithm will become the aforementioned forward-selection algorithm which only considers the benefit of a feature when no other features are activated.

It is further noted that algorithm 2 in FIG. 2C can be extended with conditional Shapley values to obtain feature sets that avoid containing redundant features. As described by algorithm 3, for which pseudocode is presented in FIG.

2D, the feature set is constructed by iteratively running the Shapley value algorithm conditioned on a growing set of features.

The functionality of system 100, in FIG. 1, will be further described below with reference to FIG. 3. FIG. 3 shows flowchart 360 outlining an exemplary method for performing volume denoising with feature selection, according to one implementation. With respect to the method outlined by FIG. 3, it is noted that certain details and volumetric features have been left out of flowchart 360 in order not to obscure the discussion of the inventive volumetric features in the present application.

Referring to FIG. 3 with further reference to FIG. 1, flowchart 360 includes training a first ML model as a denoising feature selector (hereinafter "ML model-based feature selector 112") (action 361). Training of ML model-based feature selector 112, in action 361, may be performed by software code 110, executed by hardware processor 104 of system 100, as described below.

Identifying good volumetric feature sets for volume denoising relies on efficient evaluation of the denoising quality impact between different feature subsets $S \subseteq P$. However, and as discussed above, training specialized denoisers for different volumetric feature sets quickly becomes impractical, and it is thus desirable to evaluate different volumetric feature subsets with the same trained denoiser, in this instance ML model-based feature selector 112. It is possible to evaluate the impact on the denoising error of a feature set S using a denoiser trained with the full feature set P, where the denoiser trained with P is denoted as $g_P$, and manually "turning off" other volumetric features $q \in P \backslash S$ during inference. It is noted that a feature may be "turned off" by setting it to its default value. i.e., a constant feature map containing 1 for transmittance and 0 for all other volumetric features. This evaluation can be expressed as $g_P(I,S)$, where I denotes a noisy image such as noisy image 136. However, inputs [I,S] with smaller feature subsets will inevitably be out-of-distribution for a model $g_P$ trained with all volumetric features always present. This undermines the reliability of the measured denoising error between different feature subsets.

To mitigate the out-of-distribution problem, random feature dropout may be performed during the training of ML model-based feature selector 112. That is to say, for each training example, each feature $q \in P$ may be disabled independently with a predetermined probability. By way of example, a probability of fifty percent (50%) may be used such that during training each feature subset is chosen with equal probability. Trained ML model-based feature selector 112 can more reliably predict the denoising quality obtained by using smaller feature subsets as it is trained on feature sets with missing volumetric features.

Continuing to refer to FIGS. 3 and 1 in combination, flowchart 360 further includes generating, using ML model-based feature selector 112, a plurality of candidate feature sets 134 (action 362). In order to enable early termination of feature selection and facilitate tradeoffs between denoising quality and volumetric feature set size, a set:

$$\underline{P} = \{S_i : i = 0, 1, \ldots, |P|, |S_i| = i\}$$

is progressively built by identifying candidate feature sets 134 $S_i$ of different sizes. These candidate feature sets of size i yield the minimum average denoising error l of ML model-based feature selector 112 over a dataset with denoising examples $D_S$ that can be used to select volumetric features. Formally:

$$S_i = \text{argmin}_S \, l(S) \text{ subject to } S \subseteq P \text{ and } |S| = i, \quad \text{(Equation 4)}$$

$$\text{where } l(S) := \sum_{k \in D_S} \frac{\varepsilon(\underline{g}(I^k, S^k), \underline{I}^k)}{|D_S|}. \quad \text{(Equation 5)}$$

Here, $I^k$, $S^k$ and $\underline{I}^k$ are the noisy color, auxiliary volumetric features, and reference color of an example in $D_S$ respectively, and $\varepsilon(\cdot,\cdot)$ is the error between the denoised image and reference image according to some error metric, such as a symmetric mean absolute percentage error (SMAPE), or structural dissimilarity (DSSIM) defined herein as (1-SSIM).

Finding the global optimum of the optimization problem in Equation 5 requires evaluating the loss l on all subsets, making it an intractable computation even for moderately sized feature sets. For example, given ML model-based feature selector 112 with an inference time of 230 ms, a set of 29 volumetric features, and a selection set with 93 denoising examples, finding the set of size 5 with the lowest denoising error would require approximately 11 million evaluations, or 30 days, while feature sets with up to 6 volumetric features would require about 3 months, and sets up to 9 volumetric features would require about a year to finish.

To address the above-described computational challenge, the volume denoising approach disclosed by the present application adopts a greedy solution to construct the elements of $\underline{P}$ in an incremental fashion, such that $\emptyset = S_0 \subset S_1 \subset \ldots \subset S_{|P|} = P$. Starting from an empty feature set, a set of volumetric features is progressively constructed by always selecting the one feature that improves denoising quality the most, as measured by ML model-based feature selector 112, when adding it to the set of already selected volumetric features. A more formal description of candidate feature set construction is given below:

Step 1: Start from an empty set of selected volumetric features $S_0 = \emptyset$ and set i=0.

Step 2: For all remaining volumetric features $q \in P \backslash S_i$, compute $l(S_i \cup \{q\})$ according to Equation 5.

Step 3: Set $S_{i+1} = S_i \cup \{q^*_i\}$ where $q^*_i = \text{argmin}_q l(S_i \cup \{q\})$, increment i and repeat Steps 2 and 3 until $S_{i+1} = P$.

Figure 4:
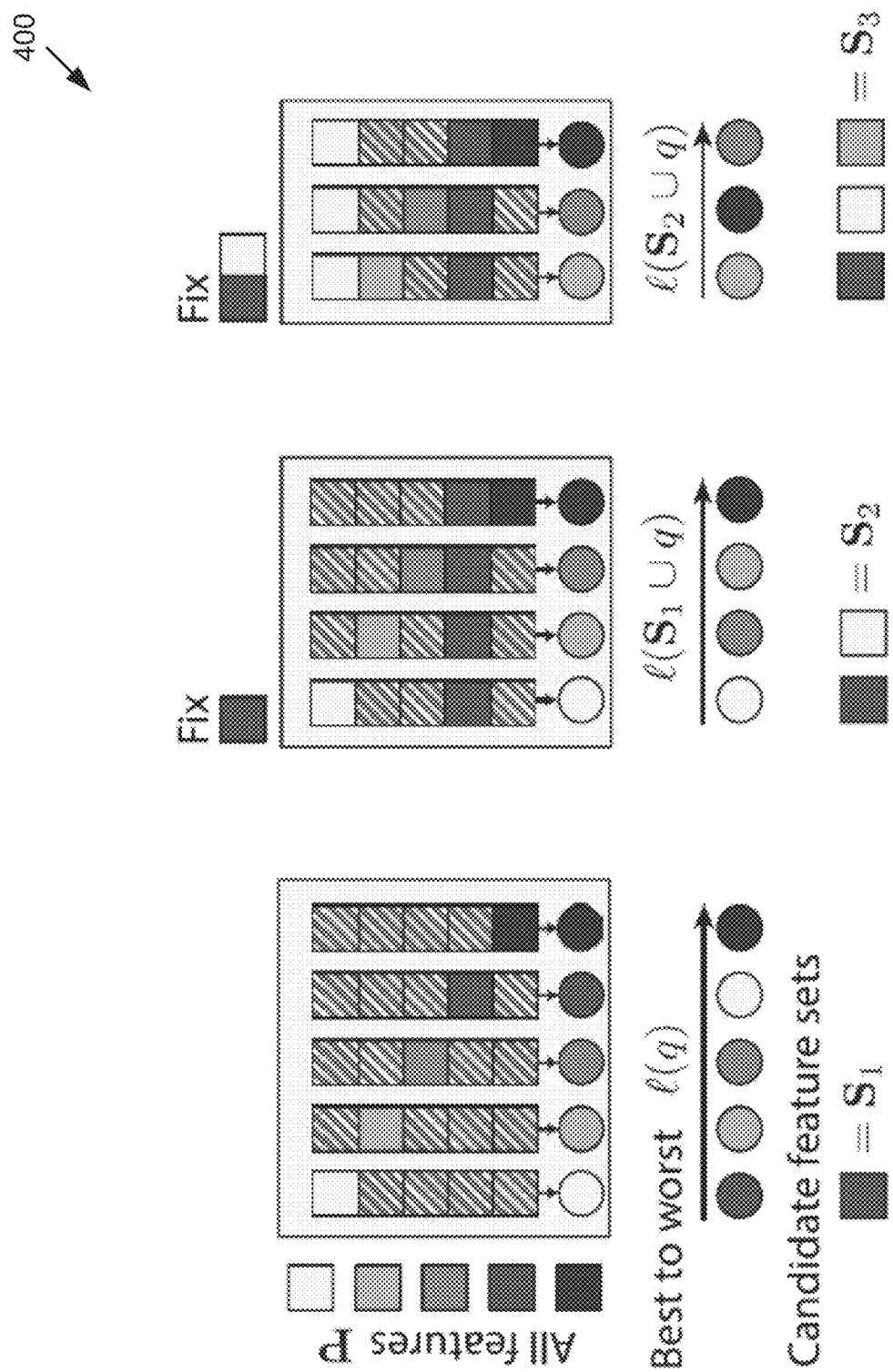
FIG. 4 shows a diagram depicting generation of a candidate feature set as part of performing volume denoising with feature selection, according to one implementation.

Referring to FIG. 4 with further reference to FIGS. 3 and 1. FIG. 4 shows diagram 400 of the progressive construction approach to generating candidate feature sets 134 performed in action 362, according to one implementation. Specifically the construction of $S_1$, $S_2$, and $S_3$ from a set P with $|P|=5$ is shown. Each feature is depicted by a uniquely filled square. Slanted squares depict disabled volumetric features and circles depict the losses $l(S_i \cup q)$ (Equation 5) with $q \in P \backslash S_i$.

To facilitate the identification of best volumetric feature set 142, as further described below by reference to action 363, the average denoising error of each candidate feature set $l(D_S, S_i)$ is stored. It is noted that each added feature is selected based on its added benefit on top of the previously selected volumetric features. Thus, by construction, the resulting candidate feature sets 134 avoid containing redundant volumetric features. It is further noted that the approach to generating candidate feature sets 134 falls within the category of forward selection methods, as known in the art.

It is also noted that, when experimenting on a smaller set of 18 volumetric features, the greedy selection approach disclosed herein is able to precisely match the results of the brute force approach described above for up to 5 volumetric features, thereby substantiating the assertion that the approximate feature selection approach taught by the present application can produce substantially optimal feature sets for a given instance of ML model-based feature selector 112. Moreover, the candidate feature set generation technique described above requires evaluating Equation 5 at most $\Sigma_{i=1}^{N-1}(|P|-i)$ times, advantageously making this algorithm of quadratic complexity in the number of volumetric features. The generation of candidate feature sets 134 as described above, may be performed in action 362 by software code 110, executed by hardware processor 104 of system 100, and using ML model-based feature selector 112.

Referring to FIGS. 3 and 1 in combination, flowchart 360 further includes identifying best volumetric feature set 142 of the plurality of candidate feature sets 134 using a predetermined selection criterion (action 363). Once candidate feature sets 134 for each size are established, those candidate feature sets can be evaluated for any desired tradeoff between cost and quality. That tradeoff can be defined using two constraining parameters: the maximum number of affordable volumetric features, $1 \leq N_{max} \leq |P|$, and the user defined. i.e., predetermined, minimal acceptable denoising quality gain $\xi$, relative to the gain using the best performing candidate feature set compared to using no volumetric features. Thus, in various implementations, the selection criterion used to identify best volumetric feature set 142 in action 363 may be the smallest achievable denoising error, or a predetermined balance between denoising quality and volumetric feature set size.

Given the constraints described above, according to one implementation, the following procedure can be used to identify best volumetric feature set 142 $\tilde{S}^*$. Starting from i=0 the relative quality gain over the user defined $\xi$ may be checked:

$$\frac{l(\emptyset) - l(S_i)}{l(\emptyset) - \min_{S_k} l(S_k)} \leq \xi \qquad \text{(Equation 6)}$$

where l is the average denoising error defined in Equation 2. This check may be performed by gradually incrementing i, until either the desired number of volumetric features i=$N_{max}$ is reached (early termination), or when Equation 3 is satisfied; at either of which points the process can be stopped and the approximate best volumetric feature set 142 is identified as $\tilde{S}^*=S_i$. It is noted that this selection procedure has almost zero overhead because all involved loss quantities are already computed and stored when constructing the candidate feature sets, as described above by reference to action 362. The identification of best volumetric feature set 142, in action 363, may be performed by software code 110, executed by hardware processor 104 of system 100.

Continuing to refer to FIGS. 3 and 1 in combination, flowchart 360 further includes training, using identified best volumetric feature set 142, one of ML model-based feature selector 112 or a second ML model (hereinafter ML model-based denoiser 140) as a denoiser (action 364). It is noted that despite the difference in the training of ML model-based feature selector 112 when compared to the training of a regular denoiser, the denoising error by ML model-based feature selector 112 for a specific feature set correlates quite well with the denoising error of a specialized denoiser trained only on that specific feature set. Nevertheless, in some implementations, ML model-based feature selector 112 may be retrained as a specialized ML model-based denoiser using best volumetric feature set 142. In other implementations, ML model-based feature selector 112 may not be used as a runtime volumetric denoiser. Instead, that operation may be provided by ML model-based denoiser 140 following training of ML model-based denoiser 140 using best volumetric feature set 142.

Thus, ML model-based denoiser 140 may be trained, or ML model-based feature selector 112 may be retrained, to operate on surface components using a conventional approach, and to operate on volume components using only best volumetric feature set 142. Action 364 may be performed by software code 110, executed by hardware processor 104 of system 100.

Continuing to refer to FIGS. 3 and 1 in combination, flowchart 360 further includes receiving noisy image 136 including noise due to rendering (action 365). As shown in FIG. 1, in some implementations, noisy image 136 may be received by system 100 from user system 120 via communication network 108 and network communication links 128. Action 365 may be performed by software code 110, executed by hardware processor 104 of system 100.

Continuing to refer to FIGS. 3 and 1 in combination, flowchart 360 can conclude with denoising, using the denoiser trained in action 364. i.e., ML model-based denoiser 140 or retrained ML model-based feature selector 112, the noise due to rendering in noisy image 136 to produce denoised image 148 (action 366). Action 366 may be performed by software code 110, executed by hardware processor 104 of system 100.

With respect to the content of noisy image 136 and denoised image 148, as noted above, noisy image 136 and denoised image 148 may include content of a variety of different types. For example, noisy image 136 and denoised image 148 be or include audio-video content having both audio and video components, or may include a still image or video unaccompanied by audio. In addition, or alternatively, in some implementations, noisy image 136 and denoised image 148 may be or include digital representations of persons, fictional characters, locations, objects, and identifiers such as brands and logos, for example, which populate a VR, AR, or MR environment. Such digital representations may depict virtual worlds that can be experienced by any number of users synchronously and persistently, while providing continuity of data such as personal identity, user history, entitlements, possessions, payments, and the like. Moreover, in some implementations, the content included in noisy image 136 and denoised image 148 may be a hybrid of traditional audio-video and fully immersive VR/AR/MR experiences, such as interactive video.

Thus, the present application discloses systems and methods for performing volume denoising with feature selection that address and overcome the deficiencies in the conventional art. By separating the light contribution from surface interactions from those arising from volume interactions into two buffers, a denoiser can advantageously be trained on both buffers to produce good denoising results for both the surface and volume buffers. Consequently, the present volume denoising solution can be combined with previous denoising methods that have been shown to perform well at denoising images with surface interaction.

Compared to existing volume denoisers, the present solution is more generally applicable to different types of volumetric effects. That is to say, the present solution is tested on a much wider range of effects, including homogeneous and heterogeneous volumes both of which are frequently seen in production scenarios. The datasets utilized herein also include more complex light transport, e.g. scenes with reflected volumes in mirrors. Moreover, due to its generality, it is contemplated that the approach to volumetric feature selection disclosed by the present application can be used to improve the solution of other problems in rendering such as up-scaling, frame-interpolation, and sampling map prediction, to name a few examples.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a hardware processor and a system memory storing a software code and one or more machine learning (ML) models;
   the hardware processor configured to execute the software code to:
   train a first ML model of the one or more ML models as a denoising feature selector;
   generate, using the trained first ML model, a plurality of candidate feature sets;
   identify a best volumetric feature set of the plurality of candidate feature sets using a predetermined selection criterion;
   train, using the identified best volumetric feature set, one of the first ML model or a second ML model of the one or more ML models as a denoiser;
   receive a noisy image including a noise due to rendering; and
   transform the noisy image to a denoised image;
   wherein transforming the noisy image to the denoised image comprises:
   decomposing color included in the noisy image into a surface contribution to the color and a volumetric contribution to the color;
   denoising, using the trained denoiser, the volumetric contribution to the color to provide a denoised volumetric color result;
   separately denoising the surface contribution to the color to provide a denoised surface color result; and
   combining the denoised surface color result with the denoised volumetric color result.

2. The system of claim 1, wherein the first ML model is trained as the denoiser.

3. The system of claim 1, wherein the one or more ML models include the first ML model and the second ML model, and wherein the second ML model is trained as the denoiser.

4. The system of claim 1, wherein generating the plurality of candidate feature sets comprises generating candidate feature sets of different sizes.

5. The system of claim 1, wherein generating the plurality of candidate feature sets comprises generating candidate feature sets of progressively increasing size.

6. The system of claim 1, wherein the predetermined selection criterion is a smallest denoising error.

7. The system of claim 1, wherein the predetermined selection criterion is a predetermined balance between a denoising quality and a volumetric feature set size.

8. A method for use by a system including a hardware processor and a system memory storing a software code and one or more machine learning (ML) models, the method comprising:
   training, by the software code executed by the hardware processor, a first ML model of the one or more ML models as a denoising feature selector;
   generating, by the software code executed by the hardware processor and using the trained first ML model, a plurality of candidate feature sets;
   identifying, by the software code executed by the hardware processor, a best volumetric feature set of the plurality of candidate feature sets using a predetermined selection criterion;
   training, by the software code executed by the hardware processor and using the identified best volumetric feature set, one of the first ML model or a second ML model of the one or more ML models as a denoiser;
   receiving a noisy image, by the software code executed by the hardware processor, the noisy image including a noise due to rendering; and
   transforming, by the software code executed by the hardware processor, the noisy image to a denoised image
   wherein transforming the noisy image to the denoised image comprises:
   decomposing color included in the noisy image into a surface contribution to the color and a volumetric contribution to the color;
   denoising, using the trained denoiser, the volumetric contribution to the color to provide a denoised volumetric color result;
   separately denoising the surface contribution to the color to provide a denoised surface color result; and
   combining the denoised surface color result with the denoised volumetric color result.

9. The method of claim 8, wherein the first ML model is trained as the denoiser.

10. The method of claim 8, wherein the one or more ML models include the first ML model and the second ML model, and wherein the second ML model is trained as the denoiser.

11. The system of claim 8, wherein generating the plurality of candidate feature sets comprises generating candidate feature sets of different sizes.

12. The method of claim 8, wherein generating the plurality of candidate feature sets comprises generating candidate feature sets of progressively increasing size.

13. The method of claim 8, wherein the predetermined selection criterion is a smallest denoising error.

14. The method of claim 8, wherein the predetermined selection criterion is a predetermined balance between a denoising quality and a volumetric feature set size.

15. A computer-readable non-transitory storage medium having stored thereon instructions, which when executed by a hardware processor, instantiates a method comprising:
   training a first ML model of the one or more ML models as a denoising feature selector;
   generating, using the trained first ML model, a plurality of candidate feature sets;
   identifying a best volumetric feature set of the plurality of candidate feature sets using a predetermined selection criterion;
   training, using the identified best volumetric feature set, one of the first ML model or a second ML model of the one or more ML models as a denoiser;
   receiving a noisy image including a noise due to rendering; and transforming the noisy image to a denoised image;
wherein transforming the noisy image to the denoised image comprises:
  decomposing color included in the noisy image into a surface contribution to the color and a volumetric contribution to the color;
  denoising, using the trained denoiser, the volumetric contribution to the color to provide a denoised volumetric color result;
  separately denoising the surface contribution to the color to provide a denoised surface color result; and
  combining the denoised surface color result with the denoised volumetric color result.

16. The computer-readable non-transitory storage medium of claim 15, wherein the first ML model is trained as the denoiser.

17. The computer-readable non-transitory storage medium of claim 15, wherein the one or more ML models include the first ML model and the second ML model, and wherein the second ML model is trained as the denoiser.

18. The computer-readable non-transitory storage medium of claim 15, wherein generating the plurality of candidate feature sets comprises generating candidate feature sets of different sizes.

19. The computer-readable non-transitory storage medium of claim 15, wherein generating the plurality of candidate feature sets comprises generating candidate feature sets of progressively increasing size.

20. The computer-readable non-transitory storage medium of claim 15, wherein the predetermined selection criterion is one of a smallest denoising error or a predetermined balance between a denoising quality and a volumetric feature set size.

* * * * *